(12) United States Patent
Zhong

(10) Patent No.: US 10,591,153 B2
(45) Date of Patent: Mar. 17, 2020

(54) WATERPROOF LED UNDERGROUND LIGHT

(71) Applicant: GUANGDONG NASITER (INTERNATIONAL) LIGHTNING CO., LTD., Jiangmen, Guangdong Province (CN)

(72) Inventor: GuiSheng Zhong, Jiangmen (CN)

(73) Assignee: GUANGDONG NASITER (INTERNATIONAL) LIGHTNING CO., LTD., Jiangmen (CN)

( * ) Notice: Subject to any disclaimer, the term of this patent is extended or adjusted under 35 U.S.C. 154(b) by 24 days.

(21) Appl. No.: 15/915,370

(22) Filed: Mar. 8, 2018

(65) Prior Publication Data
US 2019/0011119 A1 Jan. 10, 2019

(30) Foreign Application Priority Data

Jul. 10, 2017 (CN) .......................... 2017 1 0555002

(51) Int. Cl.
| | |
|---|---|
| *F21V 31/00* | (2006.01) |
| *F21S 8/02* | (2006.01) |
| *F21V 8/00* | (2006.01) |
| *F21V 3/06* | (2018.01) |
| *F21Y 115/10* | (2016.01) |
| *F21W 131/10* | (2006.01) |

(52) U.S. Cl.
CPC ............ *F21V 31/005* (2013.01); *F21S 8/022* (2013.01); *F21V 3/061* (2018.02); *G02B 6/0088* (2013.01); *G02B 6/0091* (2013.01); *F21W 2131/10* (2013.01); *F21Y 2115/10* (2016.08)

(58) Field of Classification Search
CPC ........ F21V 31/005; F21V 31/00; F21V 3/061; F21V 3/0615; F21S 8/022; F21S 8/02; G02B 6/0088; G02B 6/0091; F21W 2131/10; F21W 2131/103; F21W 2111/06; F21W 2111/02; F21W 2111/023; F21W 2111/027; B64F 1/205; E01F 9/547; E01F 9/582; E01F 9/615
See application file for complete search history.

(56) References Cited

U.S. PATENT DOCUMENTS

| | | | |
|---|---|---|---|
| 5,908,236 A * | 6/1999 | Lueken .................... | F21S 8/022 362/153.1 |
| 7,874,709 B1* | 1/2011 | Beadle ..................... | F21S 8/022 362/365 |
| 2005/0047131 A1* | 3/2005 | Blessing .................. | F21S 10/02 362/249.12 |

* cited by examiner

*Primary Examiner* — Y M. Lee
(74) *Attorney, Agent, or Firm* — Alan D. Kamrath; Mayer & Williams PC

(57) ABSTRACT

A waterproof LED underground light contains: a housing, a circuit board, an LED light source, a surface cover, a tempered glass, and a sealing rubber ring. The housing is molded from plastics and is provided with a plate hiding groove, a plate placing position, a sealing groove and a fixed side. The circuit board is configured in the plate hiding groove. The light guide plate is configured in the housing. The LED light source is configured in the side face of the light guide plate. The surface cover is configured above the fixed side. The tempered glass is configured between the surface cover and the housing. The sealing rubber ring is configured between the surface cover and the housing.

6 Claims, 3 Drawing Sheets

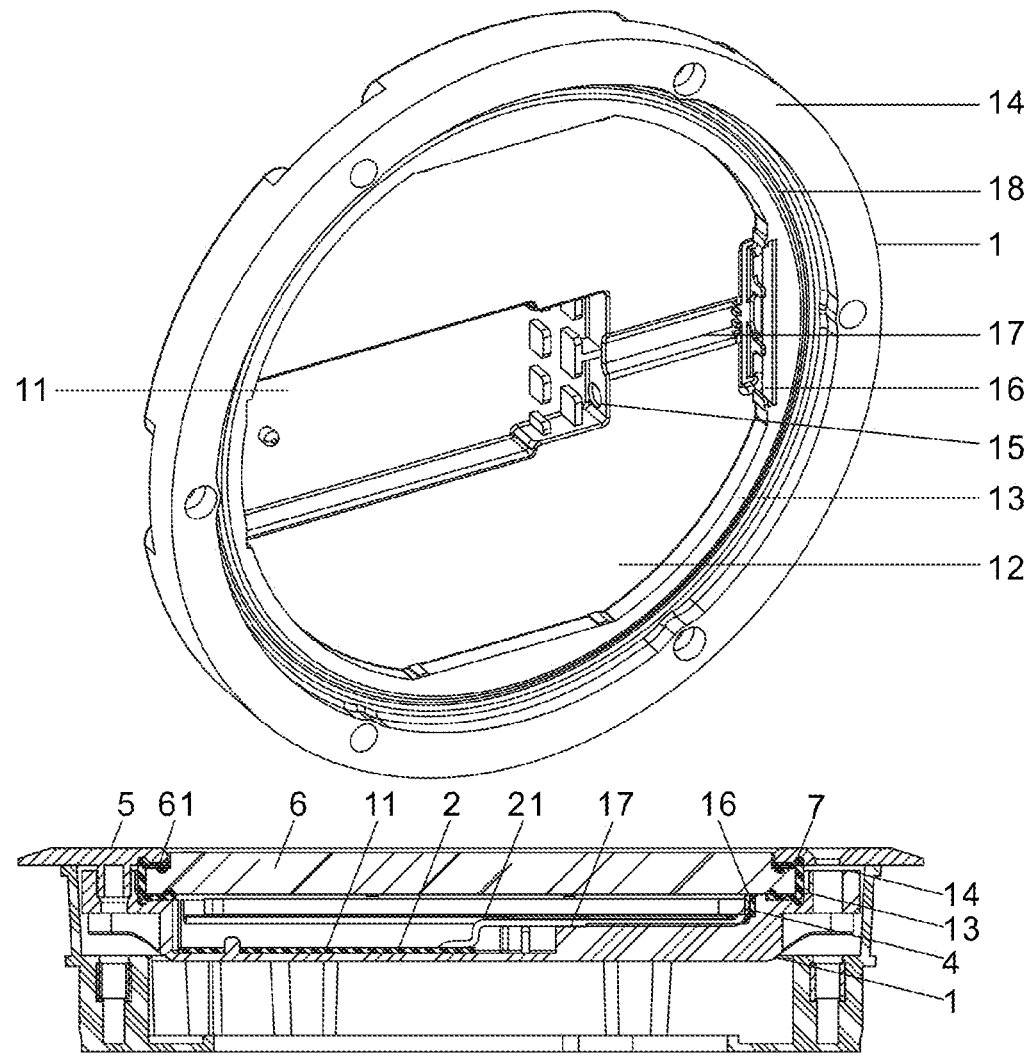

WATERPROOF LED UNDERGROUND LIGHT

TECHNICAL FIELD

The present invention relates to the field of lighting equipment, in particular to a waterproof LED underground light.

BACKGROUND ART

As lamps buried in the earth surface, the LED underground lights are widely used in outdoor lighting in squares, outdoor parks, etc. in addition to setting off the environment and adding color to the life, the LED underground lights can also be used on the roads in parks to serve as guiding lights. The underground lights can also be designed to fire emergency indicating underground lights to be used in such public places as shopping malls and parking lots, and such underground lights can provide evacuation indications to people during emergencies.

The housings of the LED underground lights available on the market are all manufactured through pressure casting by utilizing aluminum products. Even if the lights have been subjected to waterproof treatment, due to the problems of the service environment (e.g., outdoor rainwater, water used to clean the ground when indoor ground is cleaned), water will enter a pre-buried box to corrode the housing of the underground light, then after a long time, the underground light will be subjected to short circuit.

Due to the limitations of the factors including materials and structures, after the housing of the LED underground light is installed with a circuit board and an LED light source, a large space is reserved. When water corrodes the housing, the organic flatters will react chemically to generate gas in the housing gradually. When the whole housing is filled with gas, and when electric sparks arise in the circuit board or the underground light is subjected to short circuit, the underground light will be exploded, thereby severely impairing the safety of people meanwhile, since the housing has a great space, then resources are wasted and the product cost is increased.

SUMMARY OF THE INVENTION

In order to solve the above problem, the present invention provides a waterproof LED underground light. The waterproof LED underground light includes a housing molded from plastics through one processing, and provided with a plate hiding groove, a plate placing position, a sealing groove and a fixed side; a circuit board configured in the plate hiding groove; a light guide plate configured in the housing; an LED light source configured in the side face of the light guide plate; a surface cover configured above the fixed side; tempered glass configured between the surface cover and the housing; and a sealing rubber ring configured between the surface cover and the housing.

As a further improvement, the plate hiding groove of the housing is concave in the plate placing position, an outlet hole is arranged in the plate hiding groove, the plate placing position is further provided with a clamping position, the clamping position and the plate hiding groove are connected via a wire slot which is arranged therebetween, the plate placing position, the sealing groove and the fixed side form a ladder shape, with the plate placing position being arranged in the bottom, while the sealing groove being located between the plate placing position and the fixed side.

As a further improvement, the sealing groove is further provided with a groove.

As a further improvement, the thickness of the light guide plate should be equal to the height of the plate placing position.

As a further improvement, the LED light source is placed in the clamping position, and is just towards the side face of the light guide plate.

As a further improvement, the tempered glass is provided with an extending side.

As a further improvement, the cross section of the sealing rubber ring is U-shaped, and the extending side of the tempered glass is wrapped by the sealing rubber ring.

Through the above structure, in the present invention, the circuit board is placed in the plate hiding groove of the housing, a light guide plate is arranged above the circuit board, tempered glass sheathed with the sealing rubber ring is arranged above the light guide plate, and finally the surface cover is installed. The housing is molded from plastics through one processing, thereby effectively preventing the housing from being corroded, and avoiding metal electric shock accidents of the underground light; and the cooperative use of the sealing rubber ring and the sealing groove greatly improves the waterproof grade of the LED underground light. With the LED light source being in match with the light guide plate, the LED underground light has softer light rays and is more energy-saving. The structure also sufficiently utilizes the inside space of the LED underground light, such that only an extremely small space is reserved in the LED underground light, and no huge amount of gas can be saved, thereby avoiding explosive accidents, and the internal space of the LED underground light is fully utilized, thereby reducing the size of the LED underground light, and saving the cost of products.

BRIEF DESCRIPTION OF THE DRAWINGS

FIG. 3 is a perspective view of the housing of the present invention.

FIG. 4 is a sectional view of A-A in FIG. 1.

DETAILED DESCRIPTION OF THE EMBODIMENTS

Specific embodiments of the present invention will be described below with reference to the accompanying drawings.

Figure 1:
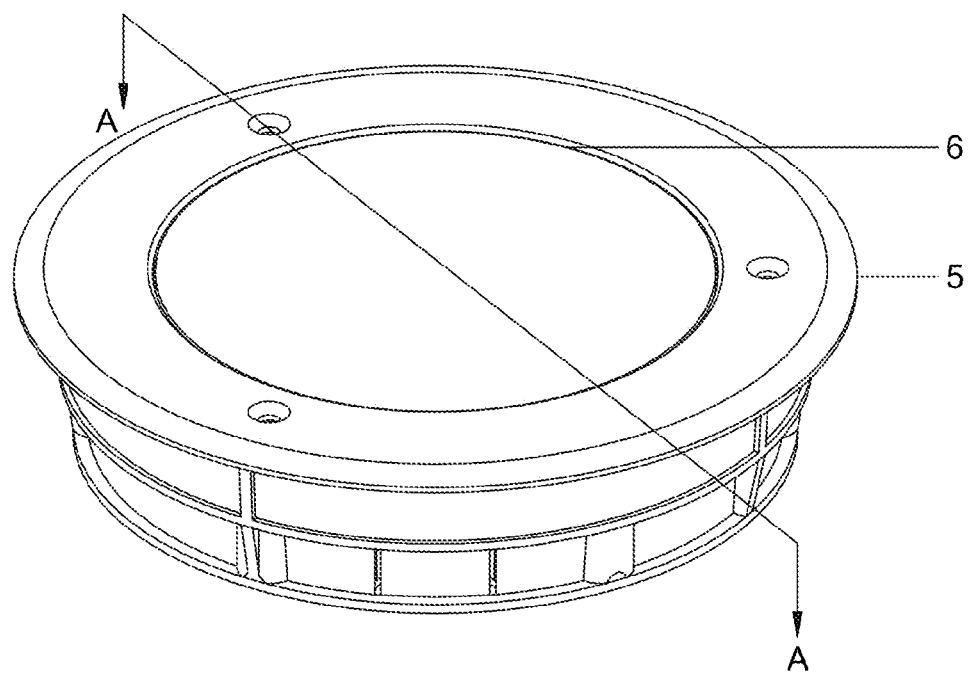
FIG. 1 is a perspective view of the present invention.
Figure 2:
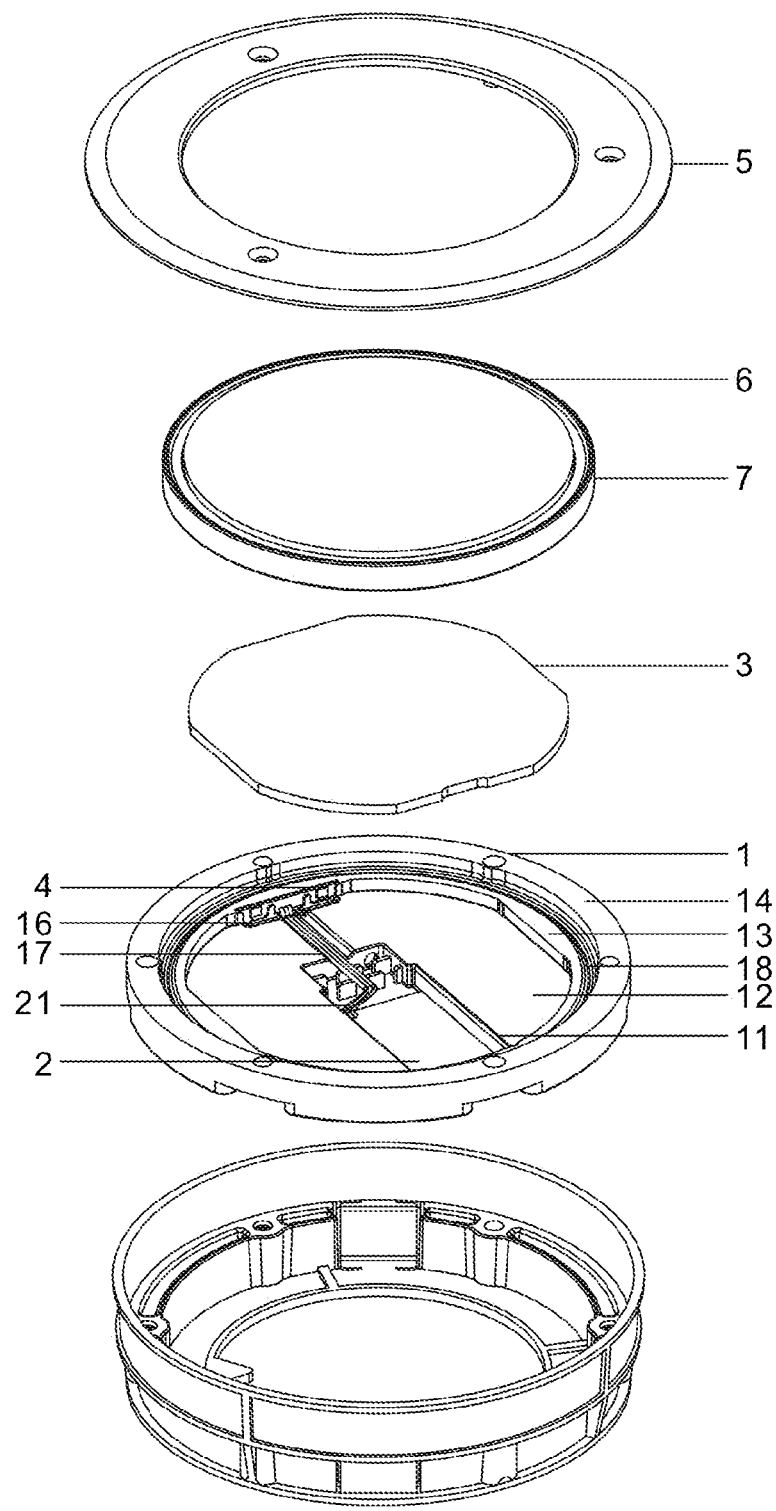
FIG. 2 is an exploded perspective view of the present invention.

As shown in FIGS. 1, 2, 3 and 4, the present invention provides a waterproof LED underground light which includes a housing 1 molded from plastics through one processing, and provided with a plate hiding groove 11, a plate placing position 12, a sealing groove 13 and a fixed side 14; a circuit board 2 configured in the plate hiding groove 11; a light guide plate 3 configured in the housing 1; an LED light source 4 configured in the side face of the light guide plate 3; a surface cover 5 configured above the fixed side 14; tempered glass 6 configured between the surface cover 5 and the housing 1; and a sealing rubber ring 7 configured between the surface cover 5 and the housing 1.

The plate hiding groove 11 of the housing 1 is concave in the plate placing position 12., an outlet hole 15 is arranged in the plate hiding groove 11, the plate placing position 12 is further provided with a clamping position 16, the clamping position 16 and the plate hiding groove 11 are connected via a wire slot 17 which is arranged therebetween, the plate placing position 12, the sealing groove 13 and the fixed side 14 form a ladder shape, with the plate placing position 12 being arranged in the bottom, while the sealing groove 13 being located between the plate placing position 12 and the fixed side 14; the sealing groove 13 is further provided with a groove 18; the height of the circuit board 2 cannot be higher than the height of the plate hiding groove 11, the thickness of the light guide plate 3 should be equal to the height of the plate placing position 12; the LED light source 4 is placed in the clamping position 16, and is just towards the side face of the light guide plate 3; the tempered glass 6 is provided with an extending side 61; and the cross section of the sealing rubber ring 7 is U-shaped, and the extending side 61 of the tempered glass 6 is wrapped by the sealing rubber ring 7.

The circuit board 2 is placed in the plate hiding groove 11, a flat cable 21 is connected with the LED light source 4 clamped in the clamping position 16 via the wire slot 17, a power line penetrates out via an outlet hole 15, the light guide plate 3 is placed in the plate placing position 12, the side face of the light guide plate 3 is just towards the LED light source 4, the tempered glass 6 sheathed with the sealing rubber ring 7 is placed on the sealing groove 13, and then the surface cover 5 is compressed on the fixed side 14, at this time, the surface cover 5, the housing 1 and the tempered glass 6 simultaneously compress the sealing rubber ring 7, such that the sealing rubber ring 7 is deformed and is filled in the whole sealing groove 13, thereby achieving a waterproof effect.

The housing 1 is molded from plastics through one processing, thereby effectively preventing the housing 1 from being corroded, and avoiding metal electric shock accidents of the underground light; and the cooperative use of the sealing rubber ring 7 and the sealing groove 13 greatly improves the waterproof grade of the LED underground light. With the LED light source 4 being in match with the light guide plate 3, the LED underground light has softer light rays and is more energy-saving. The structure also sufficiently utilizes the inside space of the LED underground light, such that only an extremely small space is reserved in the LED underground light, and no huge amount of gas can be saved, thereby avoiding explosive accidents, and the internal space of the LED underground light is fully utilized, thereby reducing the size of the LED underground light, and saving the cost of products.

The embodiments of the present invention are described in detail above in combination with the accompanying drawings, however, the present invention is not limited to the above embodiments. Within the mastered knowledge range, those skilled in the art can make various modifications to the present invention without departing from the purpose of the present invention, and these modifications shall all fall within the protection scope of the present invention.

The invention claimed is:

1. A waterproof LED underground light, comprising:
a housing molded from plastics through one processing, and said housing formed to include a rectangular-shaped plate hiding groove, a plate placing position, a sealing groove and a fixed side;
a rectangular-shaped circuit board shaped to fit within in the plate hiding groove;
a light guide plate configured in the housing;
an LED light source configured in the side face of the light guide plate;
a surface cover configured above the fixed side;
tempered glass configured between the surface cover and the housing; and
a sealing rubber ring configured between the surface cover and the housing;
wherein the plate hiding groove of the housing is concave in the plate placing position, an outlet hole is arranged in the plate hiding groove, the plate placing position is further provided with a clamping position, the clamping position and the plate hiding groove are connected via a wire slot which is arranged therebetween, the plate placing position, the sealing groove and the fixed side form a ladder shape, with the plate placing position being arranged in a bottom-facing location, while the sealing groove being located between the plate placing position and the fixed side.

2. The waterproof LED underground light of claim 1, wherein the sealing groove is further provided with a groove.

3. The waterproof LED underground light of claim 1, wherein a thickness of the light guide plate is equal to a height of the plate placing position.

4. The waterproof LED underground light of claim 1, wherein the LED light source is placed in a clamping position, and is adjacent to the side face of the light guide plate.

5. The waterproof LED underground light of claim 1, wherein the tempered glass is provided with an extending side.

6. The waterproof LED underground light of claim 5, wherein the cross section of the sealing rubber ring is U-shaped, and the extending side of the tempered glass is wrapped by the sealing rubber ring.

* * * * *